United States Patent [19]

Repp

[11] 4,319,294
[45] Mar. 9, 1982

[54] MAGNETIC TAPE SCANNING DEVICE FOR RECORDING AND/OR REPRODUCING BAND SIGNALS

[75] Inventor: Arno Repp, Darmstadt, Fed. Rep. of Germany

[73] Assignee: Robert Bosch GmbH, Stuttgart, Fed. Rep. of Germany

[21] Appl. No.: 96,161

[22] Filed: Nov. 20, 1979

[30] Foreign Application Priority Data

Dec. 2, 1978 [DE] Fed. Rep. of Germany ....... 2852167

[51] Int. Cl.³ .......................... G11B 5/52; G11B 15/60
[52] U.S. Cl. ...................................... 360/107; 360/70; 360/130.24
[58] Field of Search ................. 360/107, 108, 104, 84, 360/130.21, 130.22, 130.23, 130.24, 70, 75

[56] References Cited

U.S. PATENT DOCUMENTS

| | | | |
|---|---|---|---|
| 3,402,257 | 9/1968 | de Lange | 360/70 |
| 3,591,732 | 7/1971 | Prochnow | 360/107 |
| 3,600,508 | 8/1971 | Dann | 360/70 |
| 4,031,558 | 6/1977 | Kusaka | 360/130.24 |

Primary Examiner—Alfred H. Eddleman
Attorney, Agent, or Firm—Frishauf, Holtz, Goodman & Woodward

[57] ABSTRACT

In a tape scanning device for magnetic tape equipment of the kind used for recording and/or reproducing broad band signals, by designing the head wheel carrying the rotating magnetic heads as a tachometer disc or drum, substantial advantages are obtained when replacement of the head wheel is required due to damage or wear, in particular the avoidance of the need to achieve precise correspondence of the angular positions of the head wheel and tacho disc during reassembly.

6 Claims, 5 Drawing Figures

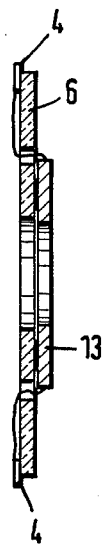
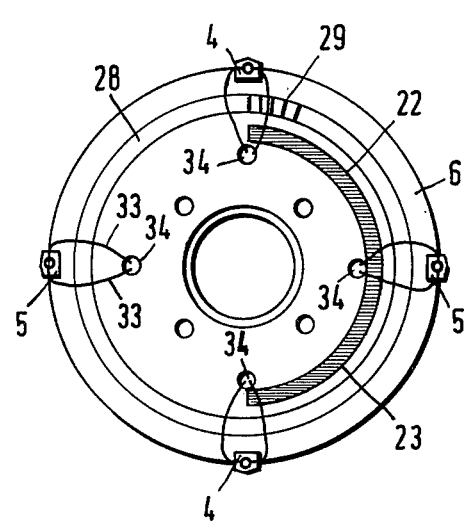
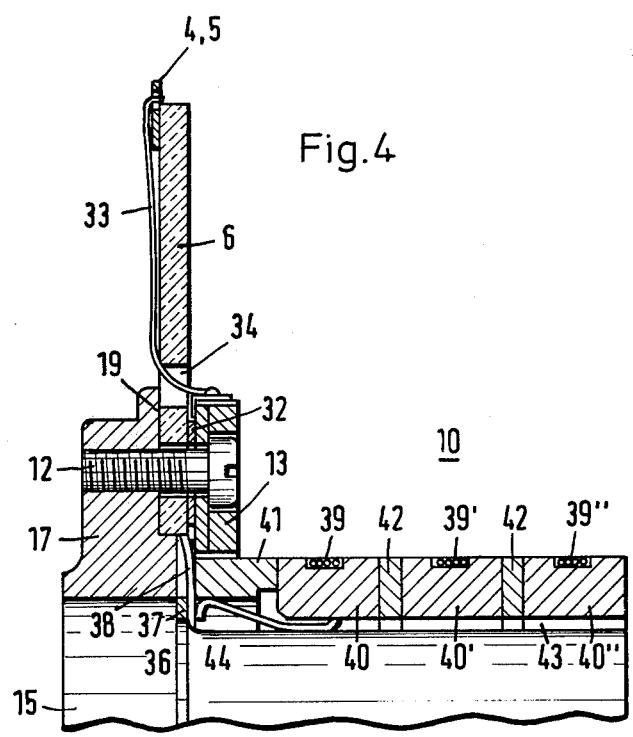

MAGNETIC TAPE SCANNING DEVICE FOR RECORDING AND/OR REPRODUCING BAND SIGNALS

BACKGROUND OF THE INVENTION

This invention relates to a scanning device for a magnetic tape equipment of the kind used for recording and/or reproducing broad band signals.

A scanning device of the above kind is disclosed in German Disclosure Document DE-OS No. 23 40 374 corresponds to U.S. Pat. No. 3,862,355. Such scanning devices are subject to a series of requirements which are in part incompatible, but all of which should be satisfied as far as possible. Thus it is to be regarded as one of the principal requirements of equipment in the magnetic storage art that the relevant data should be recorded or stored at a density as high as possible. In the case where it is required to record frequency modulated television signals having frequencies up to 13 MHz or more, or digital television signals having a bit rate of 50 Mbit/s or more, the amount of data stored per unit surface area of the magnetic tape should be as small as possible. Accordingly attempts have been made to reduce the width of the tracks inscribed upon the magnetic tape and to reduce the spacing distance between the adjacent tracks. However, it is clear that a storage system having greatly reduced track widths and track spacings will be more prone to faulty scanning during reproduction. Therefore all high quality magnetic tape equipment of the tape now being discussed includes electronic circuits for regulating the driving motor for the magnetic tape and/or for the magnetic head-carrying scanning disc to provide the best scanning conditions in reproduction.

The motor control or regulations circuits receive signals representing the instantaneous frequency and phase position of the tape drive roller or the rotating scanning disc from optically or magnetically coded discs or drums which, in all the known magnetic tape equipments, are arranged upon a common shaft with the tape drive roller or the scanning disc and therefore rotate with them in synchronism. Since, as already indicated, all magnetic tape storage systems using high density storage are particularly sensitive in respect of deviation of the magnetic scanning heads from the recorded track (tracking errors) it is necessary that these coded discs or drums (usually referred to as tacho discs) should as far as possible be free from periodic errors and should be aligned in correct angular relationship with the scanning disc.

A further requirement for scanning devices for broad band signals is to permit the rapid and economic replacement of the relevant parts of scanning devices which have become unserviceable due to wear or damage suffered by the magnetic heads when in scanning contact with the magnetic tape. On account of the extreme accuracy with which the position of the magnetic heads must be located on the periphery of the scanning disc, and on account of the high degree of concentricity required when centering the scanning disc itself upon its shaft, and finally on account of the correct angular alignment demanded for the tacho disc with respect to the scanning disc, it has in the past always been the case that the responsibility for the repair of unserviceable scanning devices rested with the manufacturer, who had available the necessary adjusting and testing devices. However, this is time consuming and expensive.

In a practical magnetic tape equipment for the recording and reproduction of broad band signals according to the oblique track method, high precision components are provided upon the shaft for accommodating the scanning disc carrying the peripherally mounted magnetic heads, which components provide, during the mounting of the scanning disc, the necessary degree of axial, radial and polar orientation. Consequently in the event of damage or wear being suffered by the magnetic heads the scanning disc itself can be independently replaced. This method of replacement functions satisfactorily in practice. On account of the random pairing of scanning discs and the other devices during assembly of the scanning device it is, however, necessary that all the relevant tolerance ranges must be very closely maintained so that in the event of an exceptional summation of several tolerances in one direction, satisfactory orientation of the scanning disc is still ensured. One example of the concurrence of precise tolerances relates to the circumpolar alignment of the scanning disc with respect to the tacho disc on the same shaft. In this case errors of eccentricity of the two discs can be additive and can result in deviations from synchronous running of the rotating shaft. The very high working accuracy demanded for the machining of the reception surfaces of both of the discs so as to avoid such errors increases the cost of manufacture of the scanning device.

SUMMARY OF THE INVENTION

Briefly, the scanning device uses a rotatably mounted scanning member carrying at its periphery a plurality of electromagnetic transducer heads, and a pulse generating device for supplying pulse-form information for use in motional control of the scanning member and having a portion adapted to rotate coaxially and in synchronism with the scanning member. In accordance with the invention, the scanning member is removable from the scanning device for repair or replacement together with the magnetic heads as a single unit.

The scanning device according to the invention thus has a single unit which combines in itself the two functions of scanning the tape and serving as a tacho device and so only this one unit requires to be precisely produced and mounted.

A further advantage is to be seen in the fact that the angular position of the scanning member upon its shaft no longer needs to be so precise. Keyways, pins, bores or similar alignment devices which could impair the smooth running of the shaft can be dispensed with.

BRIEF DESCRIPTION OF THE DRAWINGS

An embodiment of the invention will now be described with reference to the drawings, in which:

FIG. 3A and FIG. 3B are respectively a longitudinal section and a plan view of the scanning disc of the scanning device of FIG. 1; and FIG. 4 shows on a larger scale a longitudinal section of the details for securing, and the electrical connections of, the scanning disc.

DESCRIPTION OF THE PREFERRED EMBODIMENT

Figure 1:
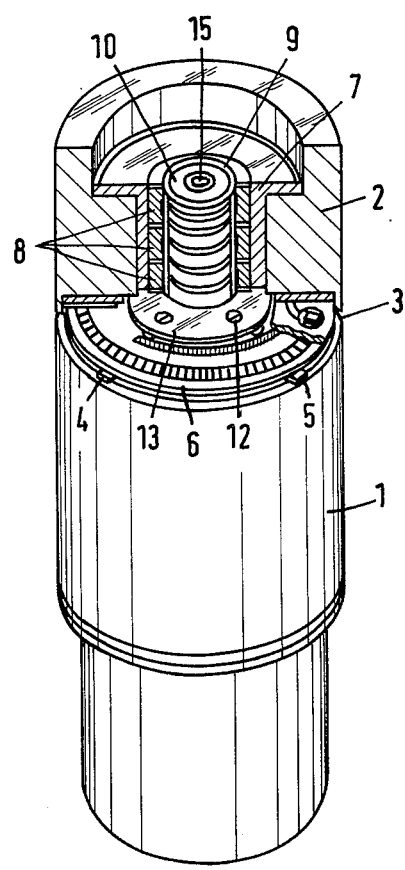
FIG. 1 shows an embodiment of a scanning device according to the invention in a partially sectioned perspective view.

The scanning device shown in FIG. 1 comprises a lower guide cylinder 1 and an upper guide cylinder 2 aligned coaxially therewith. The two guide cylinders 1 and 2 define between them an annular gap 3 within which is mounted a scanning disc 6 which carries a plurality of peripherally arranged electromagnetic transducer heads, of which examples are shown at 4 and 5. The scanning disc 6 is mounted for rotation about the same axis as that of the cylinders 1 and 2.

In operation of the scanning device in a magnetic tape equipment the upper and the lower guide cylinders are looped by a magnetic tape—not shown in the drawing—with the magnetisable layer of the magnetic tape facing the guide cylinders 1 and 2 and therefore also the electromagnetic transducers 4, 5. With this arrangement it is possible to have a comparatively narrow magnetic tape spirally looping the scanning device over a peripheral angle approaching 360°, or a wider magnetic tape can be guided about the scanning device to form a helix subtending an angle of somewhat more than 180° and having a pitch approximately equal to the width of the magnetic tape. In both cases the electromagnetic transducers carried upon the rotating disc inscribe or scan parallel tracks on the moving magnetic tape at an angle of inclination to the edge of the tape. Alternatively, it is possible to arrange for the direction of movement of the magnetic tape to be parallel to the rotational axis of the scanning disc and, by the use of external guiding elements, to deform the magnetic tape into a trough so that it covers about one quarter of the peripheral surface of the scanning device and is inscribed or scanned in parallel tracks approximately transverse to the centre line of the tape. In each of these three cases it is possible to arrange that the guide cylinders rotate either individually or in common, or remain stationary, and practical magnetic tape equipments exist for most of the nine possible combinations of features mentioned above. The particular type of guiding and manner in which the tape contacts the scanning device is not crucial for the applications of the present invention, however, so that its field of use is not restricted.

Figure 2:
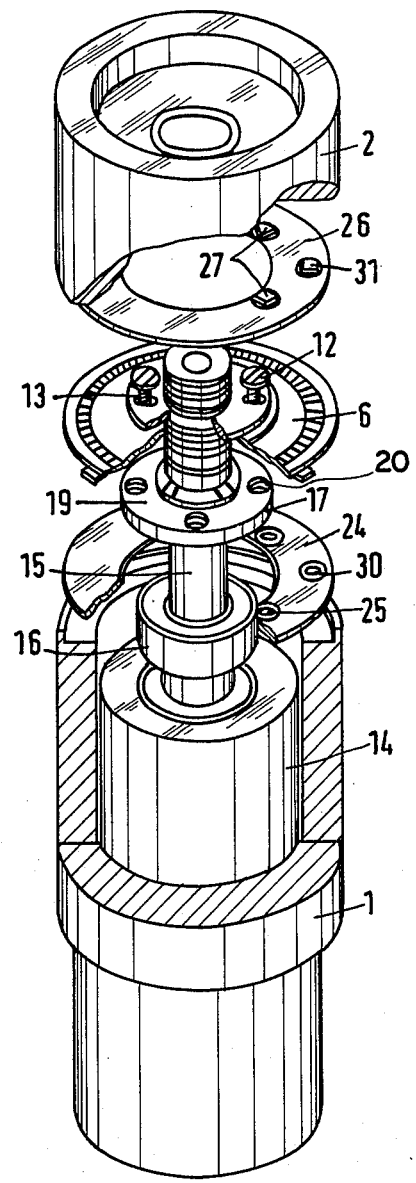
FIG. 2 shows the same scanning device as FIG. 1 but disassembled to clarify the construction.

In the practical embodiment of FIGS. 1 and 2 the scanning device is equipped with stationary upper and lower guide cylinders 1 and 2. The securement and axial alignment of the cylinders can be effected by structural means such as are described, for example, in U.S. Pat. No. 4,150,017, assigned to the assignee of this application, to which German Patent Disclosure Document DE OS No. 25 10 166, corresponds in which case the scanning device here shown is intended for use in a magnetic tape equipment using helical looping through an angle of somewhat more than 180°. The upper guide cylinder 2 contains member 8 of an inductive transducer 9 in a socket 7, whilst the rotary member 10 of the transducer 9 is securely connected to a shaft 15 coaxial with the cylinders 1 and 2. The scanning disc 6 (also serving as the coded disc) is nonrotatably secured to the shaft 15 by means of screws 12 and a clamping ring 13, as will be explained in more detail with reference to FIG. 4.

As shown in FIG. 2, the stationary part 14 of the driving motor is socketed into the lower guide cylinder 1 to which it is nonrotatably connected. The shaft 15 of the driving motor 14 is mounted in roller bearings, of which one is visible at 16. Upon the shaft 15 there is rigidly secured a seating flange 17 for the scanning disc 6. The plane surface 19 of the seating flange 17 contains four tapped bores 20 to receive securing screws 12 for a clamping ring 13, to secure the scanning disc 6 to the plane surface 19 of the seating flange 17. At the end of the shaft 15 there is arranged the rotary member 10 of the inductive transducer 9. The scanning disc 6 preferably consists of a light transmitting material, for example glass having suitable optical and mechanical properties, and carries at one planar side thereof (as shown, the upper side) annular tracks of different diameters for generating pulse sequences. These pulse sequences and their significance will be explained in conjunction with FIGS. 3A and 3B.

FIGS. 3A and 3B show the parts of the scanning device which are replaceable in the event of damage or wear of the electromagnetic transducers 4, 5. The disc 6 carries at its periphery two pairs of electromagnetic transducers, of which each two transducers having the same function are arranged diametrically opposite each other. Thus, for example, the two rotating erase heads are indicated by 4, whilst 5 indicates the two video recording and reproducing magnetic heads. Upon an inner annular track 22 the scanning disc 6 has a segmental marking 23, which occupies about one half of the circumference of the disc, and which has a different degree of light permeability from the other half of the same track which is merely left transparent. When the scanning disc 6 is driven by the magnetic tape equipment the segmental marking 23 is illuminated by two light-emitting diodes (LEDs) 25 (FIG. 2) angularly staggered by 90° in a printed circuit ring 24 and arranged at the same radial spacing as the marking 23. At the other side of the scanning disc 6 photosensitive elements 27 are provided upon a code ring 26 of similar shape to the ring 24, these photosensitive elements being arranged axially in register with the LED's 25. Upon rotation of the scanning disc and the consequent intermittent illumination of the photosensitive elements by the diodes an indication is obtained of the instantaneous position of the scanning disc 6 by the bright-dark transitions of the track 22. In consequence of the 90° staggering of the two diodes 25 and the corresponding photosensitive elements 27 it is also possible to derive from the bright-dark transitions a forward-reverse indication for the rotary movement of the disc 6, which indication is employed, for example, for the electronic control of the commutatorless direct current motor 14.

The scanning disc 6 carries a further track 28 (FIG. 3B) which is of larger radius than the track 22 and carries a number of markings 29 spaced at equal intervals. Upon the printed circuit ring 24 there is an LED 30 located at a radial distance from the axis of the disc 6 equal to that of the track 28, and a cooperating photosensitive element 31 is arranged in a corresponding position upon the code ring 26. The interruptions of the light beam passing between the diode 30 and the photosensitive element 31 provide a measure of the rotary velocity of the head disc 6 and are employed in appropriate evaluation circuits for speed control and synchronisation of the scanning disc 6 and the magnetic tape passing thereover, such circuits being known per se.

In FIGS. 3A and 4 it will be seen that the scanning disc 6 forms with the clamping ring 13 a single structural unit, which results from cementing together the two accurately aligned components 6 and 13 and an interposed spacing ring 32 (FIG. 4) with a temperature-stable adhesive, for example epoxide resin.

FIG. 4 shows on an enlarged scale the scanning disc 6, together with the clamping ring 13 and the spacing ring 32 of FIG. 3A, secured by screws 12 to the shaft 15 of the driving motor 14. In more detail, the disc 6 is secured to the plane surface 19 of the seating flange 17, whilst the seating flange 17 is immovably secured to the shaft 15. Of the magnetic heads carried on the periphery of the disc 6 those of each opposite pair are arranged to perform the same characteristic function. For example the two electromagnetic transducers indicated at 4 are intended to erase recorded matter, whilst the two electromagnetic transducers 5 are provided for alternate recording and/or reproduction of information. Each electromagnetic transducer 4, 5 is provided with an exciter coil whose connecting wires 33 are passed through a respective bore 34 to the outer periphery of the ring 13. At the side of the clamping ring 13 facing the scanning disc 6 there are provided conducting paths extending radially from the inner to the outer periphery of the clamping ring 13, and corresponding in number to the number of leads 33. Conductively connected one-to-one to the conducting paths of the clamping ring 13 are an equal number of solder points or partially through-plated bores 35 provided at the periphery of the ring, at each of which points a soldered connection is made between a respective conductor 33 from the exciter winding of a magnetic head 4, 5 and the outer end of a respective conducting path. The shaft 15 is provided in the region of the seating flange 17 with an annular shoulder 36 for accommodating an insulating ring 37. Individual spring contact segments 38 are arranged upon the ring 37 and these extend radially outwards and bear resiliently upon the inner ends of respective ones of the conducting paths on the clamping ring 13.

The rotary member 10 of the inductive transducer 9 is so arranged upon the free end of the shaft 15 that cores 40, 40' and 40" each having a respective winding 39, 39' and 39" are enclosed between two metal screening rings 42 and 42' and an insulating spacing ring 41. The ends of the windings 39, 39', 39" are taken in a suitable manner to the inside of the transducer 10 whence they are laid in grooves 43 leading to the contact segments 38 of the ring 37, to which they are respectively soldered at 44.

In the event of a replacement of the scanning disc 6 becoming necessary the attachment screws 12 are released and then the disc 6 together with the clamping ring 13 and the spacing disc 32 are lifted from the shaft 15 over the rotary member 10 of the transducer 9. In this way the resilient electrical connection is released between the contact segments 38 and the conducting paths at the inner end of the clamping ring 13, this electrical connection being restored in the same manner when another disc 6 is fitted. After the tightening of the screws 12 the new disc 6 is ready for use without any further adjusting operations. After the fitting of the upper cylinder 2 the complete scanning device can be installed and put into use. It may be stated at this stage that the invention is not restricted to its use in a magnetic tape equipment having a scanning disc. A rotary scanning drum can alternatively be employed instead of a disc.

In the arrangement described having two recording and reproduction heads 5 and two erase heads 4 at the periphery of the disc 6, the rotary transducer requires only three sets of winding cores because the two rotating erase heads 4 are always electrically connected and therefore can be connected through a common transducer winding.

According to a modification of the above embodiment of the invention it is possible to establish the conducting path from the transducers 4 and 5 on the outer periphery of the disc 6 to the soldered support points 35 of the clamping ring 13 by providing suitable conducting tracks upon the glass body of the disc 6 by the use of thin film or printed circuit metallisation techniques. Through paths from one side to the other of the disc 6 can be established via conductively lined apertures (throughplated bores). If required it is possible also to provide the markings 23 and 28 upon the head disc 6 in a similar manner, simultaneously with the conducting tracks.

I claim:

1. A scanning device for a magnetic tape equipment of the kind used for recording and/or reproducing broad band signals comprising
   a scanning support structure (1, 2);
   a rotatable member (5) rotatably mounted in said structure;
   a plurality of electromagnetic transducer heads (4, 5);
   a disc (6) of a material of high light permeability mounted on said rotatable member (5) for rotation relative to said support structure;
   and means for generating information in form of pulses to control rotary movement of the disc including a pattern (32, 29) of areas of lesser light permeability arranged in an annular configuration upon the surface of the scanning disc, and means (25, 27; 30, 31) positioned on said support structure for optically scanning said pattern as the disc rotates;
   and wherein, in accordance with the invention,
   said electromagnetic transducer heads (4, 5) are secured to said disc carrying said pattern thereon, and said disc, with the transducer heads and the pattern thereon is removable as a unit from said support structure for repair or replacement from the support structure to maintain accurate alignment of the position of the transducer head with respect to said patterns on the disc.

2. A scanning device according to claim 1, further including an inductive transducer having a fixed element (8) positioned in the support structure, and a rotary element (9) secured to the rotary member (15) for rotation coaxially and in synchronism with the scanning disc (6);
   and means electrically connecting the transducer heads (4, 5) and the rotary element of the inductive transducer on the rotary member including a plurality of spring contacts making electrical connection between the transducer heads and the rotary element, said electrical connection being broken at the spring contacts upon removal of the disc, and with it the transducer heads and said pattern from the support structure to insure maintenance of alignment of said pattern and transducer heads on the disc upon replacement of said unit, and without disturbing the position of said rotary element of the inductive transducer on the rotary member (15).

3. A scanning device according to claim 1, further including an inductive transducer having a rotary element adapted for rotation coaxially and in synchronism with the disc, and means including a plurality of spring contacts making electrical connection between the transducer heads and the rotary element, said electrical connection being broken at the spring contacts upon removal of the disc from the support structure.

4. A scanning device according to claim 3, wherein the electrical connection further includes conducting tracks carried upon the surface of the disc.

5. A scanning device according to claim 4, wherein the conducting tracks are applied by metallization.

6. A scanning device according to claim 4, wherein the pattern of areas upon the scanning disc are applied simultaneously and by the same technique as are the conducting tracks.

* * * * *